United States Patent
Ecochard

(10) Patent No.: US 8,863,911 B2
(45) Date of Patent: Oct. 21, 2014

(54) DEVICE FOR MOVING AND ATTACHING A COMPONENT BETWEEN TWO POSITIONS

(75) Inventor: Michel Ecochard, Chaponnay (FR)

(73) Assignee: Renault SAS, Boulogne Billancourt (FR)

( * ) Notice: Subject to any disclaimer, the term of this patent is extended or adjusted under 35 U.S.C. 154(b) by 361 days.

(21) Appl. No.: 13/264,282

(22) PCT Filed: Apr. 20, 2010

(86) PCT No.: PCT/FR2010/050760
§ 371 (c)(1),
(2), (4) Date: Nov. 29, 2011

(87) PCT Pub. No.: WO2010/122266
PCT Pub. Date: Oct. 28, 2010

(65) Prior Publication Data
US 2012/0097489 A1 Apr. 26, 2012

(30) Foreign Application Priority Data
Apr. 20, 2009 (FR) ..................... 09 52569

(51) Int. Cl.
*B66B 11/02* (2006.01)
*B66B 9/16* (2006.01)
*B66B 11/00* (2006.01)
*B65G 67/00* (2006.01)
*B66F 7/02* (2006.01)
*B60S 5/06* (2006.01)
*B60L 11/18* (2006.01)
*B66F 17/00* (2006.01)

(52) U.S. Cl.
CPC ............... *B60S 5/06* (2013.01); *Y02T 10/7005* (2013.01); *B66F 7/02* (2013.01); *Y02T 10/705* (2013.01); *B60L 11/1822* (2013.01); *Y02T 10/7072* (2013.01); *B66F 17/00* (2013.01); *B60L 11/1879* (2013.01); *Y02T 90/124* (2013.01); *Y02T 90/14* (2013.01)
USPC ........... 187/401; 187/240; 187/259; 414/281; 414/399

(58) Field of Classification Search
CPC .......... B66B 9/00; B66B 9/003; B66B 11/06; B66B 11/0075; B66B 11/007; B66F 7/02; B66F 9/07; B66F 11/04; B60K 1/04; B60S 5/06
USPC .......... 187/240, 259, 262, 401; 254/337, 338; 414/249, 281, 391, 399, 427, 428, 443
See application file for complete search history.

(56) References Cited

U.S. PATENT DOCUMENTS

| 118,128 | A | * | 8/1871 | Heavner | 182/144 |
| 155,306 | A | * | 9/1874 | Hinkle | 187/259 |

(Continued)

FOREIGN PATENT DOCUMENTS

| DE | 42 29 687 | 3/1994 |
| DE | 10 2007 032 210 | 10/2008 |

(Continued)

OTHER PUBLICATIONS

International Search Report Issued Aug. 10, 2010 in PCT/FR10/050760 filed Apr. 20, 2010.

*Primary Examiner* — William E Dondero
*Assistant Examiner* — Minh Truong
(74) *Attorney, Agent, or Firm* — Oblon, Spivak, McClelland, Maier & Neustadt, L.L.P.

(57) ABSTRACT

A device for moving and attaching a component between an operating position in which the component is rigidly connected to a structure and a non-operating position below the operating position and in which the component is detached from the structure. The device includes: a frame rigidly secured to the ground and including vertical guiding columns; a lifting table for moving the component from the operating position to the non-operating position and vice versa, the lifting table being guided vertically along the guiding columns; a mechanism locking and unlocking the component on and outside the structure and rigidly connected to the lifting table; and an assembly of four cables associated with return pulleys, wherein one end of the cables is mounted to a winch that can raise and lower the lifting table between the non-operating position and the operating position, while the other cable end is rigidly connected to the lifting table.

8 Claims, 3 Drawing Sheets

(56) References Cited

U.S. PATENT DOCUMENTS

| | | | | |
|---|---|---|---|---|
| 170,087 | A | * | 11/1875 | Howard ............... 187/259 |
| 449,026 | A | * | 3/1891 | Anderson ............. 187/243 |
| 517,219 | A | * | 3/1894 | Hickman .............. 187/235 |
| 588,982 | A | * | 8/1897 | Gray ................. 182/129 |
| 747,133 | A | * | 12/1903 | Cadwell .............. 187/235 |
| 937,781 | A | * | 10/1909 | Eddy ................. 425/63 |
| 1,710,442 | A | * | 4/1929 | Warshaw .............. 187/262 |
| 3,117,652 | A | * | 1/1964 | Wallace .............. 187/213 |
| 3,172,501 | A | * | 3/1965 | Ramer ................ 187/244 |
| 3,235,106 | A | * | 2/1966 | Diehl ................ 414/429 |
| 3,503,476 | A | * | 3/1970 | Burch et al. ......... 188/159 |
| 3,913,757 | A | * | 10/1975 | Lovey ................ 414/390 |
| RE32,118 | E | * | 4/1986 | Godbersen ............ 187/266 |
| 4,867,627 | A | * | 9/1989 | Tseng ................ 414/249 |
| 5,697,753 | A | * | 12/1997 | Aurora et al. ........ 414/398 |
| 5,772,360 | A | * | 6/1998 | Wood, II ............. 405/3 |
| 6,241,048 | B1 | * | 6/2001 | Heilmann ............. 187/263 |
| 2008/0294283 | A1 | | 11/2008 | Ligrano |
| 2010/0145717 | A1 | | 6/2010 | Hoeltzel |
| 2011/0315488 | A1 | * | 12/2011 | Yoshioka ............. 187/262 |

FOREIGN PATENT DOCUMENTS

| | | |
|---|---|---|
| EP | 0 575 864 | 12/1993 |
| NL | 1 005 212 | 8/1998 |

\* cited by examiner

DEVICE FOR MOVING AND ATTACHING A COMPONENT BETWEEN TWO POSITIONS

TECHNICAL FIELD

The invention relates to a device that allows a component to be moved and fixed between a non-operational position and an operational position, notably within a structure, and that allows this component to be locked/unlocked into and from this structure.

More specifically, the device of the present invention falls within the context of the replacement of an electric battery within a motor vehicle.

Because oil is becoming ever scarcer, on the one hand, and because of the political desire to adopt an environmentally-friendly approach on the other, motor vehicle manufacturers are nowadays seeking to replace the thermal energy that powers said vehicles with electrical energy. One of the major difficulties currently encountered by said manufacturers in implementing this source of energy lies in the limited range or autonomy of the electric batteries available at the present time, in addition to the particularly long time it takes to charge them.

The invention is thus aimed at standard replacement of the battery or batteries in a limited space of time rather than at the use of traditional devices that the owner of the vehicle can use to recharge the batteries, the charging of the batteries occurring at a battery recharging station, for example one dedicated to this use.

PRIOR ART

Problem Addressed

The replacement of a component within a moving structure and in the particular case in point the replacement of a battery within a motor vehicle runs into various difficulties. Leaving aside the not-inconsiderable weight of such a battery, typically weighing several hundreds of kg, it is also necessary for it to be unlocked or detached from said vehicle so that it can be withdrawn from the vehicle so as to be recharged. As a corollary, it is also necessary to fit and lock a charged battery within said vehicle. The new difficulty of centering the battery within the vehicle between the non-operational position of the charged battery and its insertion within the vehicle thus also arises.

Indeed it must be kept in mind that this operation of changing of the battery has to be done in a limited length of time in order to be economically viable and in order not to put potential customers off this energy recharge solution, this limited length of time typically being of the order of 3 to 5 minutes.

The difficulty then arises of leaving a fixed frame of reference, in this instance the ground at the battery change station and going to a moving frame of reference, namely the vehicle mounted on a lift, assuming that the battery change is being done from underneath said vehicle.

No technical solution allowing this type of handling operation to be performed in such a short space of time is known to-date.

SUMMARY OF THE INVENTION

The present invention overcomes these various difficulties and to do so relates to a device for moving and fixing a component between two positions, these respectively being an operational position in which said component is attached to a structure, and a non-operational position underneath said operational position, in which said component is detached from the structure.

This device comprises:
a fixed chassis secured to the ground and equipped with vertical guide pins;
a lifting platform intended firstly to bear said component from the operational position into the non-operational position and vice versa, said lifting platform being guided vertically along said guide pins;
locking and unlocking means for locking and unlocking said component onto and from the structure, these being attached to the lifting platform;
and a set of four cables associated with return pulleys, one of the ends of which cables is mounted on a winch capable of raising and lowering said lifting platform between the non-operational position and the operational position, and the other end of which cables is attached to the platform.

In other words, the invention involves fitting a lifting device with relatively coarse means of centering with respect to the structure within which the component is to be inserted or from which said component is to be removed and with lifting means consisting of cables rather than more rigid members such as actuators, so as to provide a certain degree of compliance in order to cope with the differential in positioning of the structure within which the component is to be inserted or from which the component is to be removed in relation to the fixed frame of reference consisting of the ground on which the chassis of the device of the invention is mounted.

According to an advantageous feature of the invention, the chassis in fact comprises a fixed chassis attached to the ground and a moving chassis able to move in the two directions of the plane parallel to the ground, said moving chassis being positioned relative to the structure within which or from which said component is to be inserted or extracted by means of sensors attached to the moving chassis, and bearing against determined zones of said structure.

In this particular instance and in the context of changing the battery of a motor vehicle, these sensors consist of rigid rods bearing against the external flat of the rear wheels of the vehicle in question when this vehicle is mounted on the lift, said rods being secured to the moving chassis, the latter being capable of sliding on slideways in the two directions of the horizontal plane parallel to the fixed frame of reference of the fixed chassis.

According to one advantageous feature of the invention, the guide pins are each made up of two elements, these being a lower element attached to the fixed chassis and an upper element attached to the moving chassis, the two elements being substantially aligned with one another to allow the lifting platform to pass from the fixed frame of reference when it is in the lower non-operational position into the frame of reference of the structure when the lifting platform rises so that the component can be inserted into said structure.

The lifting of the lifting platform at four points using cables and the presence of a certain degree of play in the upper pins allow the component to shift sideways slightly as it ascends and thus encourages its correct insertion within the structure so that, by construction, at the end of the lifting travel, it is positioned precisely and can be locked within the structure, the component and the structure being fitted with fixing means for this purpose.

BRIEF DESCRIPTION OF THE FIGURES

The way in which the invention can be embodied and the ensuing advantages thereof will become better apparent from the exemplary embodiment which follows, given by way of nonlimiting indication with the support of the attached figures.

EMBODIMENTS OF THE INVENTION

Figure 1:
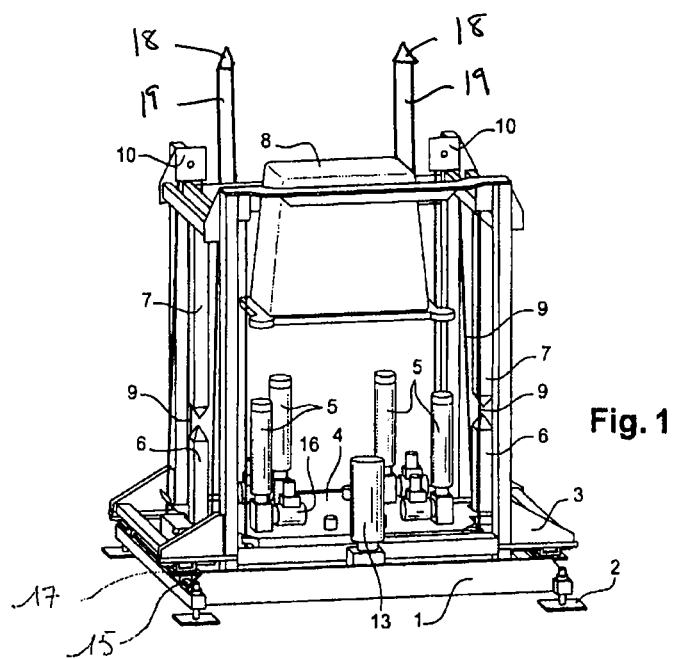
FIG. 1 is a schematic perspective view of the lifting device according to the invention in the non-operational position.

The following description illustrates for preference a device of the type in question more particularly suited to replacing the batteries of an electrically powered motor vehicle. However, it must be understood that the invention is not restricted to this application alone.

The various successive views aimed at illustrating the positioning of a component within a moving structure have therefore been depicted in FIGS. 1 to 5.

To make the description simpler, the upper lift on which the motor vehicle is placed in order to change its battery has not been depicted. The device according to the invention is therefore, in essence, intended to be positioned underneath the lift intended to support said vehicle or in a pit provided for that purpose.

It is made up first of all of a fixed chassis (1) fixed by mounting plates (2) to the bottom of the pit. It therefore constitutes a fixed frame of reference.

This fixed chassis (1) further accepts a moving chassis (3) able to move in the directions X and Y, that is to say in the directions of the horizontal plane that defines the fixed frame of reference (1), respectively parallel and perpendicular to the direction in which the motor vehicle moves relative to the pit.

For this purpose, this moving chassis (3) is mounted on slideways oriented respectively in the X and Y direction (15, 17) and formed within the fixed chassis (1).

The movement of the moving chassis (3) with respect to the fixed chassis (1), which movement is intended to allow a rough initial centering of the device of the invention with respect to the frame of reference consisting of the vehicle, is achieved by means of sensors (18) consisting of rigid rods (19) which press against the external lateral flats of the rear wheels of the vehicle the battery of which is to be changed, these said rods being attached to said moving chassis (3). Thus, by pressing said rods against the external flats of the rear wheels of the vehicle, the moving chassis (3) can be made to move with respect to the fixed chassis (1) and therefore, as a corollary, an initial centering of said moving chassis with respect to the motor vehicle can be achieved. There is no need to specify that the tracks that accept the vehicle at the battery change station are positioned in such a way that they already provide an extremely rough initial centering of the vehicle with respect to the battery change device of the invention.

Figure 6:
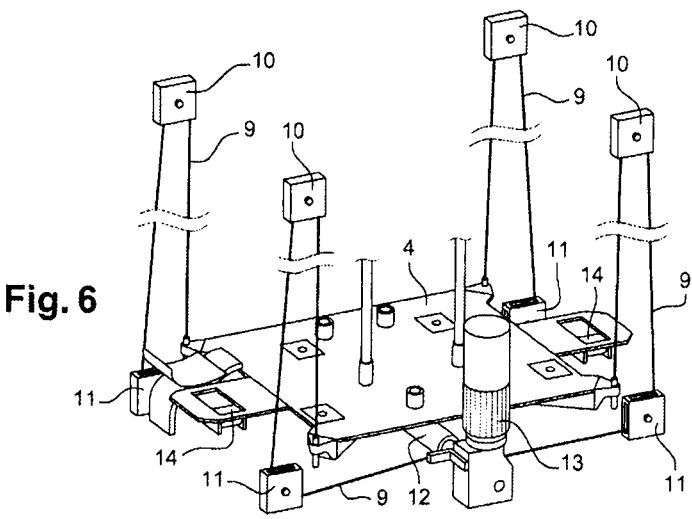
FIG. 6 is a schematic depiction illustrating the lifting system that uses a cable incorporated into the device of the invention.

The device of the invention further comprises a horizontal lifting platform (4), the four corners (see FIG. 6) of which receive the free ends of four lifting cables (9). These lifting cables (9) are wound around return pulleys, these respectively being upper (10) and lower (11) pulleys. The other end of said cables (9) is attached to a drum (12) of a winch that is electrically operated using a motor (13).

Figure 3:
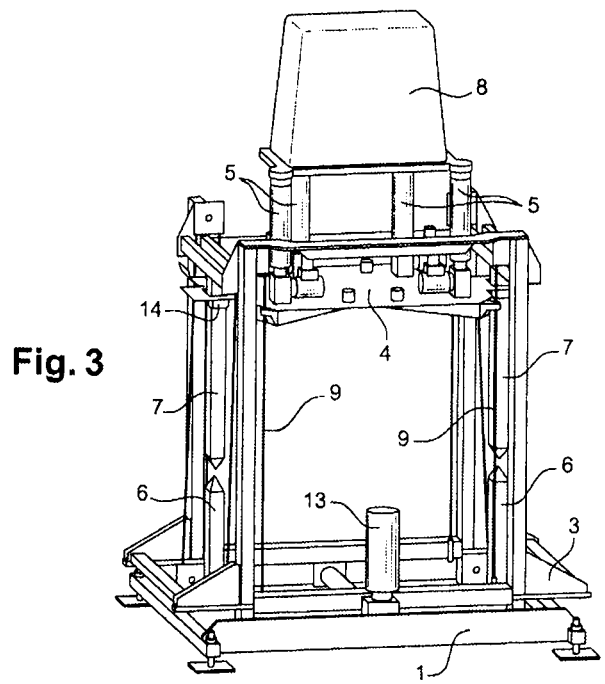
FIG. 3 is a schematic perspective view illustrating the lifting device at the end of its upward travel with FIG. 4 being a detail view thereof.
Figure 4:
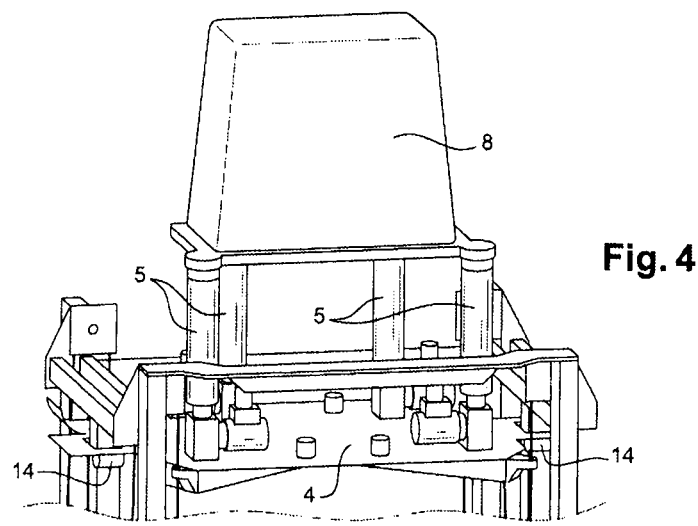

This lifting platform (4) can therefore be raised and lowered by means of this set of lifting cables (9), return pulleys (10) and (11) and the winch (12) and (13), between a lower position as depicted in FIG. 1 and a raised position as illustrated in FIGS. 3 and 4.

This lifting platform is guided along two vertical pins each consisting of two elements (6) and (7) that are not attached to one another. More specifically, the two lower elements (6) are attached to the fixed chassis (1) and therefore to the fixed plane of reference already defined, whereas the two upper elements (7) are attached to the moving chassis (3). The two elements of one and the same guide pin are substantially collinear. Specifically, according to the relative movement of the moving chassis (3) in relation to the fixed chassis (1), this alignment can be disrupted.

However, in order to allow the lifting platform to rise, and as can be seen in the various figures, the contiguous regions of the elements (6) and (7) end in a point so as to allow the platform in its ascending phase to transfer from the fixed frame of reference consisting of the chassis (1) to the moving frame of reference consisting of the chassis (3). The lifting platform rests against these elements (6) and (7) by means of rollers (14) which slide with practically no friction against these said elements.

According to another feature of the invention, the lifting platform (4) is fitted with locking-unlocking modules (5) intended, as their name suggests, on the one hand to lock the battery (8) and, more generally, the component within the motor vehicle and, as a corollary, to unlock it when the reverse operation is to be carried out, that is to say when said battery is to be withdrawn from the vehicle. These modules are each actuated by means of one or more electric motors (16) to perform the locking and unlocking operation.

Such modules are, for example, described in the patent application filed by the same applicant on this same day.

In brief, they are made up of two link rods in addition to a push rod to provide an upward movement of the locking-unlocking members with which they are each equipped and, as a corollary, to perform the actual locking or unlocking of the lock and, in general, of the fixing members with which the battery is equipped, onto or from complementary members formed for this purpose within the vehicle.

In the example described, four locking/unlocking modules have been depicted. However, it should be emphasized that this number can vary and depend on the number of battery locking members on the vehicle.

The various operations for fitting a battery within a motor vehicle will now be described in greater detail.

Following the rough centering of the moving chassis (3) with respect to the fixed chassis (1) as described earlier, a new or recharged battery (8) is brought in substantially plumb with the lifting platform (4) by a conveyor which has not been depicted in order not to overload the figures needlessly. However, it should be emphasized that this conveyor supports said battery outside of the future regions thereof that will be used for gripping by the locking modules (5) attached to the lifting platform (4).

Figure 2:
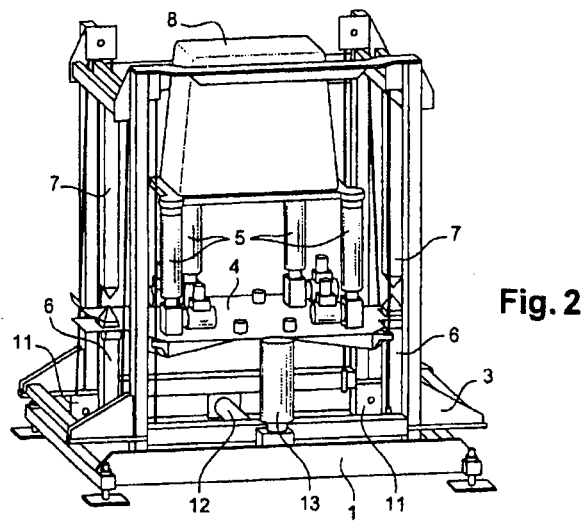
FIG. 2 is a schematic perspective view of the device of the invention in an intermediate position of carrying the component.

The lifting platform then undergoes a first ascent phase by means of the assembly consisting of the lifting cables (9) and the winch (12, 13) in order to end up with the upper end of said locking-unlocking modules (5) positioned at the level of their respective gripping zone or position for this purpose with which said battery (8) is equipped. During this first ascent phase, the lifting platform (4) is guided by the lower elements (6) of the guide pins and therefore in a fixed frame of reference (FIG. 2).

The lifting platform then continues its upward movement and is now guided by the upper elements (7) of the guide pins with a slight offset of the order of a few millimeters in order to ensure better centering of the battery so that it can be inserted within the motor vehicle, this offset being inherent to be relative movement of the moving chassis (3) with respect to the fixed chassis (1) during the rough centering step described earlier.

Because of the use of lifting cables, a certain degree of lateral freedom in the raising of the battery associated with the lifting platform (4) is ensured. Thus, in the final phase of the upward travel, said battery finds itself in a final or substantially final phase of its ascent and at this moment is guided by the internal structure of the motor vehicle, and more specifically by the housing intended to contain it. Thus it may be that a certain lateral adjustment remains in terms of positioning, and this is precisely rendered possible by the use of the lifting cables and by the play between the upper elements (7) and the rollers (14) of the lifting platform in the upper part of the travel.

When the cables have reached their maximum travel and by construction, the battery is in place within the motor vehicle. The locking/unlocking modules (5) are actuated to effectively lock said battery to appropriate means with which the motor vehicle is provided.

Figure 5:
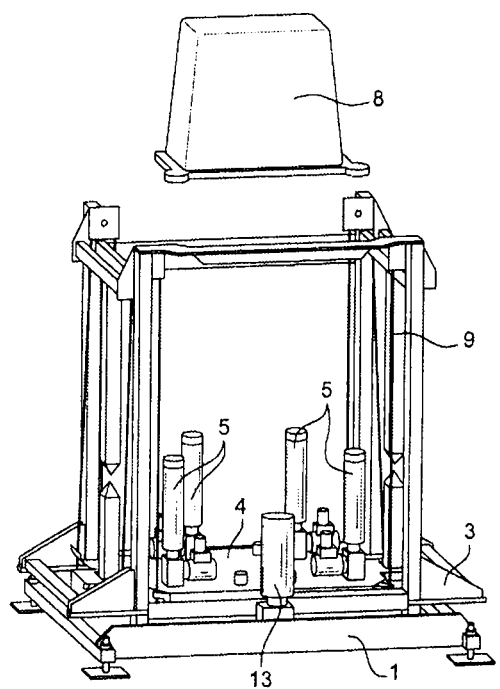
FIG. 5 is a schematic perspective view illustrating the device of the invention after the component has been locked within the structure.

After locking, the lifting platform (4) is lowered back to its initial position (FIG. 5).

The unlocking operation is absolutely identical to but the reverse of the various steps described above.

The great benefit of the lifting device according to the invention will be appreciated inasmuch as it provides a certain degree of flexibility in the ascent phase in order to cope with slight defects of flatness or horizontality between the housing intended to accept the battery within the motor vehicle and the original frame of reference of the battery before it is fitted. This compliance is inherent to the use of cables giving the installation an additional degree of freedom, encouraging fine adjustment of the position of the battery, notably during the ascent phase.

The invention claimed is:

1. A device for moving and fixing a component between two positions, respectively of an operational position in which the component is attached to a structure, and a non-operational position underneath the operational position, in which the component is detached from the structure, the device comprising:
    a fixed chassis secured to ground and including vertical guide pins;
    a moving chassis configured to move with respect to the fixed chassis and including vertical guide pins;
    a lifting platform configured to bear the component from the operational position into the non-operational position and vice versa, the lifting platform being guided vertically by directly contacting the guide pins of the fixed chassis and the guide pins of the moving chassis;
    locking and unlocking means for locking and unlocking the component onto and from the structure, and being attached to the lifting platform; and
    a set of four cables associated with return pulleys, a first end of each of the cables is mounted on a winch configured to raise and lower the lifting platform between the non-operational position and the operational position, and a second end of each of the cables is attached to the lifting platform.

2. The device for moving and fixing a component as claimed in claim 1, wherein the moving chassis is configured to move in two directions of a plane parallel to the ground, the moving chassis being positioned, relative to the structure within which or from which the component is to be inserted or extracted, by sensors attached to the moving chassis and bearing against determined zones of the structure.

3. The device for moving and fixing a component as claimed in claim 2, wherein the guide pins attached to the fixed chassis are substantially aligned with the guide pins attached to the moving chassis to allow the lifting platform to pass from the fixed chassis when it is in the non-operational position into the moving chassis when the lifting platform rises so that the component can be inserted into the structure.

4. The device for moving and fixing a component as claimed in claim 1, wherein the guide pins of the fixed chassis each end in a point and the guide pins of the moving chassis each end in a point.

5. A device for moving and fixing a battery between two positions, respectively being an operational position in which the battery is attached to a motor vehicle, and a non-operational position underneath the operational position, in which the battery is detached from the vehicle, the device comprising:
    a fixed chassis secured to ground and including vertical guide pins;
    a moving chassis configured to move with respect to the fixed chassis and including vertical guide pins;
    a lifting platform configured to bear the battery from the operational position into the non-operational position and vice versa, the lifting platform being guided vertically by directly contacting the guide pins of the fixed chassis and the guide pins of the moving chassis;
    locking and unlocking means for locking and unlocking the battery onto and from the vehicle, and being attached to the lifting platform; and
    a set of four cables associated with return pulleys, a first end of each of the cables is mounted on a winch configured to raise and lower the lifting platform between the non-operational position and the operational position, and a second end of each of the cables is attached to the lifting platform.

6. The device for moving and fixing a battery as claimed in claim 5, wherein the moving chassis configured to move in two directions of a plane parallel to the ground, the moving chassis being positioned, relative to the vehicle within which or from which the battery is to be inserted or extracted, by sensors attached to the moving chassis, the sensors including rigid rods which bear against an external flat surface of rear wheels of the vehicle, the moving chassis being capable of sliding along slideways in the two directions of the plane parallel to the ground.

7. The device for moving and fixing a battery as claimed in claim 5, wherein the guide pins are substantially aligned with the guide pins attached to the moving chassis to allow the lifting platform to pass from the fixed chassis when it is in the lower non-operational position into the moving chassis when the lifting platform rises so that the battery can be inserted into the vehicle.

8. The device for moving and fixing a battery as claimed in claim 5, wherein the guide pins of the fixed chassis each end in a point and the guide pins of the moving chassis each end in a point.

* * * * *